(No Model.)
T. LINKE.
VALVE.
No. 568,858.　　　　　Patented Oct. 6, 1896.
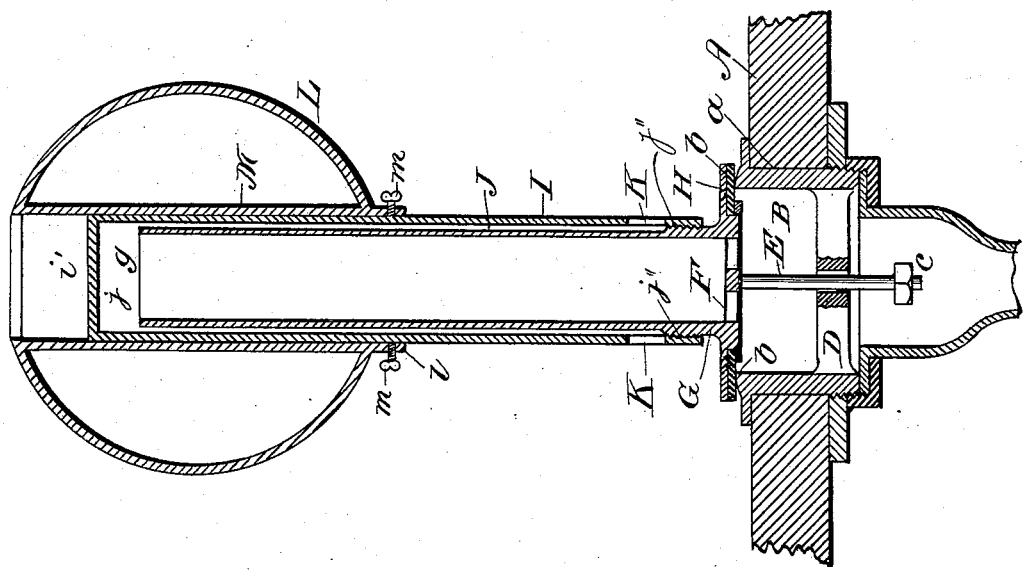
WITNESSES:
M. B. Harris
L. M. Muller
INVENTOR
Theodore Linke
BY
Edgar Tate & Co
ATTORNEYS.

UNITED STATES PATENT OFFICE.

THEODORE LINKE, OF NEW YORK, N. Y.

VALVE.

SPECIFICATION forming part of Letters Patent No. 568,858, dated October 6, 1896.

Application filed July 30, 1895. Serial No. 557,633. (No model.)

*To all whom it may concern:*

Be it known that I, THEODORE LINKE, a citizen of the United States, and a resident of New York, in the county of New York and State of New York, have invented certain new and useful Improvements in Valves, of which the following is a specification, reference being had to the accompanying drawing, forming a part thereof, in which similar letters of reference indicate corresponding parts.

The object of my invention is to provide a valve specially useful for water-tanks which will operate upon water rising to a predetermined level.

The invention consists in the novel details of improvement and combinations of parts that will be more fully hereinafter set forth, and then pointed out in the claim.

Reference is to be had to the accompanying drawing, forming part hereof, wherein the figure is a vertical section of my improved valve.

In the accompanying drawing, in which similar letters of reference indicate corresponding parts, the letter A indicates the bottom of a suitable water-tank, which may be provided with a suitable cock and ball-valve to regulate the supply of water. The bottom A has an aperture $a$, in which is fitted a coupling B, held in place and tightly fitted by any suitable means, the coupling B being adapted to be connected to an outlet-pipe C in any desired manner.

In the coupling B is a spider-guide D for a rod E, which has a nut $c$ to keep it from rising from the coupling too far, and a head F at the lower end of a pipe G. The coupling B has a valve-seat $b$, adapted to receive a valve or washer H, carried by the pipe G, to close the coupling B. The upper end of pipe G extends upwardly a suitable height above the coupling.

I is a pipe surrounding pipe G and having its upper end $i'$ closed above the open end $g$ of pipe G, a space J being thus formed between the pipes G and I. Pipe I near its lower end has one or more openings K leading to space J, and the pipes G and I are threaded together at $j''$, as shown, so they will move together.

L is a hollow air-tight float, having a central tube or chamber M, open on bottom and top and receiving the pipe I. Float L has a lower extension $l$, provided with set-screw $m$ to hold said float upon the pipe I, whereby the float can be adjusted up and down on pipe I; but the parts M and I could be threaded together, if desired, for this purpose.

The operation is as follows: Valve H normally rests upon seat $b$, but when the water rises in the tank high enough to raise float L the latter lifts tubes G and I and valve H, thus allowing water to pass down the coupling B under valve or washer H. This flow of water exhausts the air from pipes G I and space J, so that when the float L allows pipes G and I to descend to close valve H upon its seat the partial vacuum in said pipes will cause water to enter holes K and space J and wash down pipe G by siphonic action until the water in the tank is down to hole K, whereupon the entering air will break the siphon and the water will cease to run. The action of the device is entirely automatic. By adjusting float L up or down in tube I the time for flushing can be regulated.

Having now described my invention, what I claim is—

The combination in a water-tank, which is provided with a suitable valve, in the top of which is fitted a coupling adapted to be connected with the outlet-pipe, said coupling being provided with a spider-guide, and a tube provided with an outwardly-directed flange, to which is fitted a washer, which is adapted to close the opening in said coupling, said tube being provided with a spider-frame in the lower end thereof, to which is secured a depending rod, provided with a nut, which passes through to the spider-guide in the coupling, an exterior tube closed at one end, and provided at the lower end thereof with lateral ports or openings, said ends being interiorly screw-threaded, and adapted to engage the screw-threads upon the enlarged portion of the first-mentioned tube, whereby the annular chamber is formed between said tubes, and a hollow spherical float having a central tubular portion and semicircular airtight chambers upon each side thereof, the tubular portion of which is adapted to engage the outer tube and retain the edges thereof, by means of said screws, substantially as described.

In testimony that I claim the foregoing as my invention I have signed my name, in presence of the subscribing witnesses, this 27th day of July, 1895.

THEODORE LINKE.

Witnesses:
  L. M. MULLER,
  A. M. CUSACK.